(No Model.)

E. P. LORCH.
CUTTER HEAD.

No. 257,349. Patented May 2, 1882.

Witnesses:
J. W. Garner
W. H. Kern

Inventor:
E. P. Lorch
per
F. A. Lehmann,
Atty

UNITED STATES PATENT OFFICE.

ERNEST P. LORCH, OF NEW YORK, N. Y.

CUTTER-HEAD.

SPECIFICATION forming part of Letters Patent No. 257,349, dated May 2, 1882.

Application filed February 8, 1882. (No model.)

*To all whom it may concern:*

Be it known that I, E. P. LORCH, of New York, in the county of New York and State of New York, have invented certain new and useful Improvements in Lathes for Turning Wood; and I do hereby declare the following to be a full, clear, and exact description of the invention, such as will enable others skilled in the art to which it pertains to make and use it, reference being had to the accompanying drawings, which form part of this specification.

My invention relates to an improvement in lathes for turning wood; and it consists in a holder of any suitable construction, which is provided with a series of longitudinal parallel grooves, recesses, or projections, in which the shank of the cutter is set, the shank being shaped so as to fit in and correspond with them, and thus act as a guide and aid in the rapid and accurate adjustment of the cutter, which is held in any desirable place by means of a suitable cover or clamp.

The object of my invention is to so construct the revolving cylinder or other holder in which the cutters are held that they will cut absolutely true with each other, and so that they can be rapidly and accurately set back and forth or laterally to make any adjustment that may be required.

Figure 1:
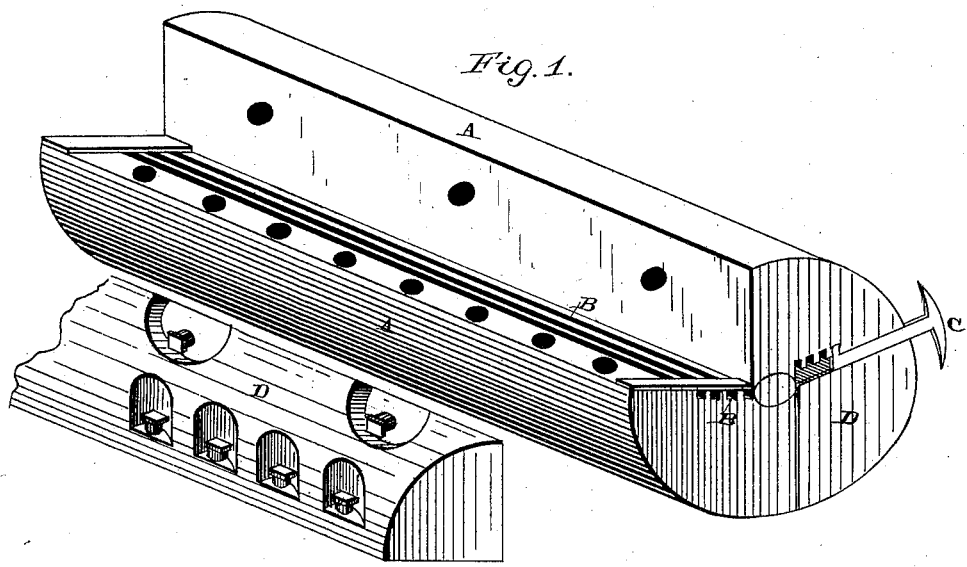
Figure 2:
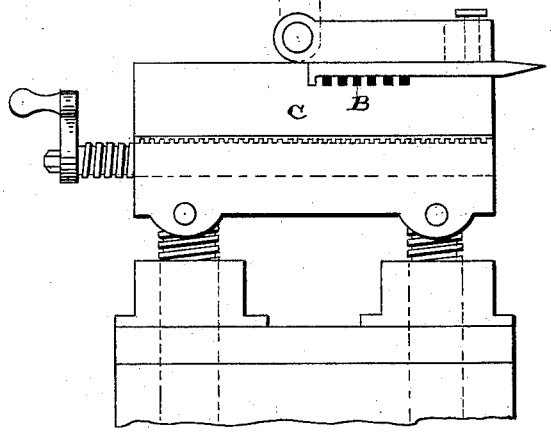
Figure 3:
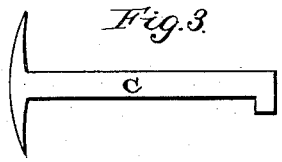

Figure 1 is a perspective of a cylinder-head with one of the cutters placed in position. Fig. 2 is an end elevation of a tool-carriage. Fig. 3 shows the shape and form of a cutter that is used.

A represents a revolving cylinder to be used in connection with a wood-lathe or molding-machine, and which is intended to carry two sets of cutters. Upon opposite sides of this cylinder there are suitable portions of the cylinder removed, and in each one of these surfaces are made a number of longitudinal parallel grooves, recesses, or projections, B, which will be made any desired distance apart. Each one of the cutters C will have the end of its shank shaped to fit the grooves, recesses, or projections, as shown, so as to catch in one of them, and each one of the cutters can then be adjusted laterally or back and forth from one groove, recess, or projection to another, so as to adjust them in any desired relation to each other with speed and accuracy. Each recess in the side of the cylinder is filled by a block or casting, D, which is provided with any desired number of set-screws running through it at right angles to each other, so that the block can be clamped down upon the top of the tool with any desired degree of force.

When it is desired to adjust the cutters it is only necessary to remove the block or casting D, when the cutters can be moved laterally or adjusted so as to catch in another groove, recess, or projection.

It is not necessary that these grooves, recesses, or projections should be made in the face of the cylinder, as here shown, for longitudinal parallel flanges or projections raised upon the top surface will answer the same purpose. In this case, however, instead of having the shank of the cutter turned at right angles, suitable recesses may be made in the shank of the cutter, so as to fit over the tops of the flanges or projections, and thus allow the cutters to be adjusted in the same manner and by the same means.

In Fig 2 a tool-carriage, C, is shown, which is provided with longitudinal parallel grooves, recesses, or projections in the same manner as the cylinder.

Having thus described my invention, I claim—

A circular cylinder-head, A, having the right-angled recesses made in opposite sides, and provided with the parallel grooves B, in combination with the cutters C and the blocks D, which fill the recesses in the sides of the cylinder, substantially as shown and described.

In testimony whereof I affix my signature in presence of two witnesses.

ERNEST PHILLIP LORCH.

Witnesses:
EUGENE S. GOADBY,
SAMUEL SCHUMACHER.